(12) United States Patent
Gutierrez

(10) Patent No.: US 8,047,491 B2
(45) Date of Patent: Nov. 1, 2011

(54) STRAPPING BASE AND ASSEMBLY

(75) Inventor: Shawn Gilbert Gutierrez, Las Vegas, NV (US)

(73) Assignee: Gil Products, LLC, Las Vegas, NV (US)

( * ) Notice: Subject to any disclaimer, the term of this patent is extended or adjusted under 35 U.S.C. 154(b) by 754 days.

(21) Appl. No.: 11/956,604

(22) Filed: Dec. 14, 2007

(65) Prior Publication Data

US 2008/0210464 A1    Sep. 4, 2008

Related U.S. Application Data

(60) Provisional application No. 60/892,473, filed on Mar. 1, 2007.

(51) Int. Cl.
*A47F 5/00*    (2006.01)
(52) U.S. Cl. ............ 248/300; 248/906; 174/50; 174/58
(58) Field of Classification Search .............. 248/300, 248/906, 68.1; 220/3.2, 3.6, 3.9; 174/58, 174/61
See application file for complete search history.

(56) References Cited

U.S. PATENT DOCUMENTS

| | | | | |
|---|---|---|---|---|
| 3,584,348 A | * | 6/1971 | Soltysik | 248/68.1 |
| 4,492,357 A | * | 1/1985 | Morrill | 248/674 |
| 7,154,040 B1 | * | 12/2006 | Tompkins | 174/50 |
| 7,398,949 B2 | * | 7/2008 | Weech et al. | 248/220.21 |

* cited by examiner

*Primary Examiner* — Gwendolyn W Baxter
(74) *Attorney, Agent, or Firm* — Workman Nydegger

(57) ABSTRACT

A strapping base including a central portion having a generally flat surface, the central portion having a central hole pattern defined therein, an angled portion coupling the central portion to the lateral portion, and at least one lateral portion having a generally flat surface and having a plurality of lateral holes defined therein, wherein the lateral portion is offset from the central portion.

16 Claims, 3 Drawing Sheets

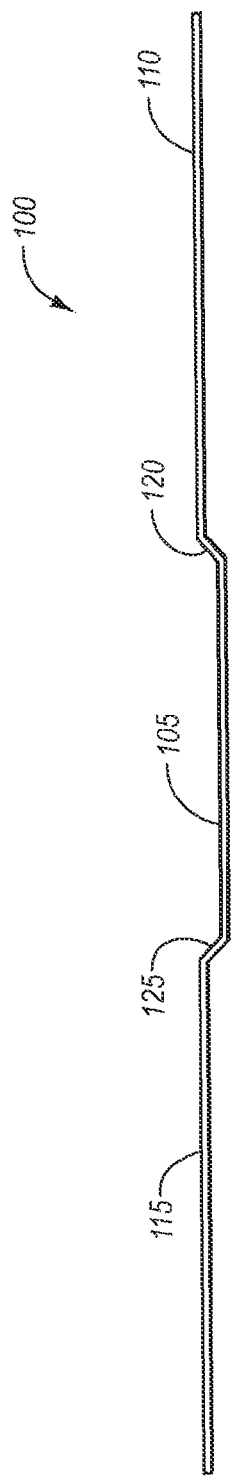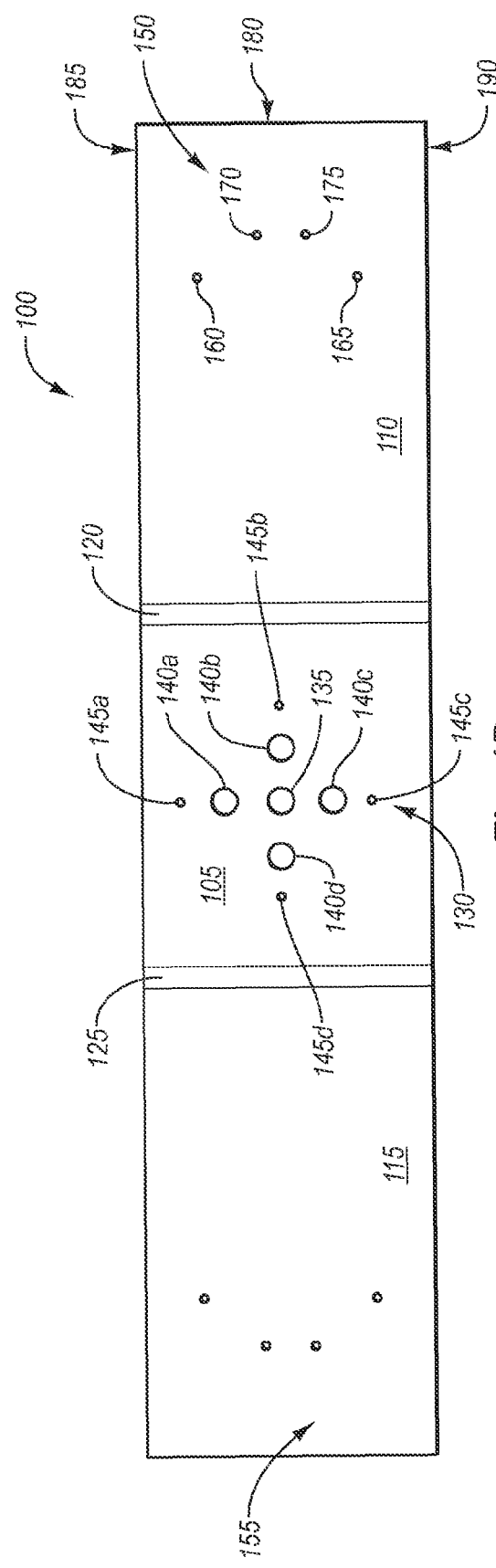
Fig. 1A
Fig. 1B

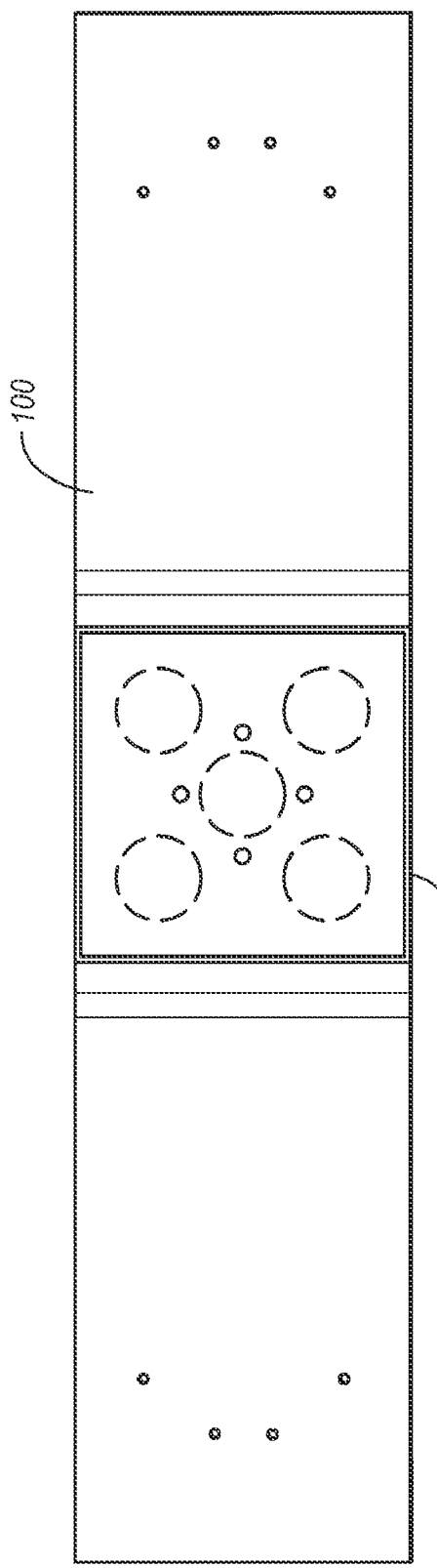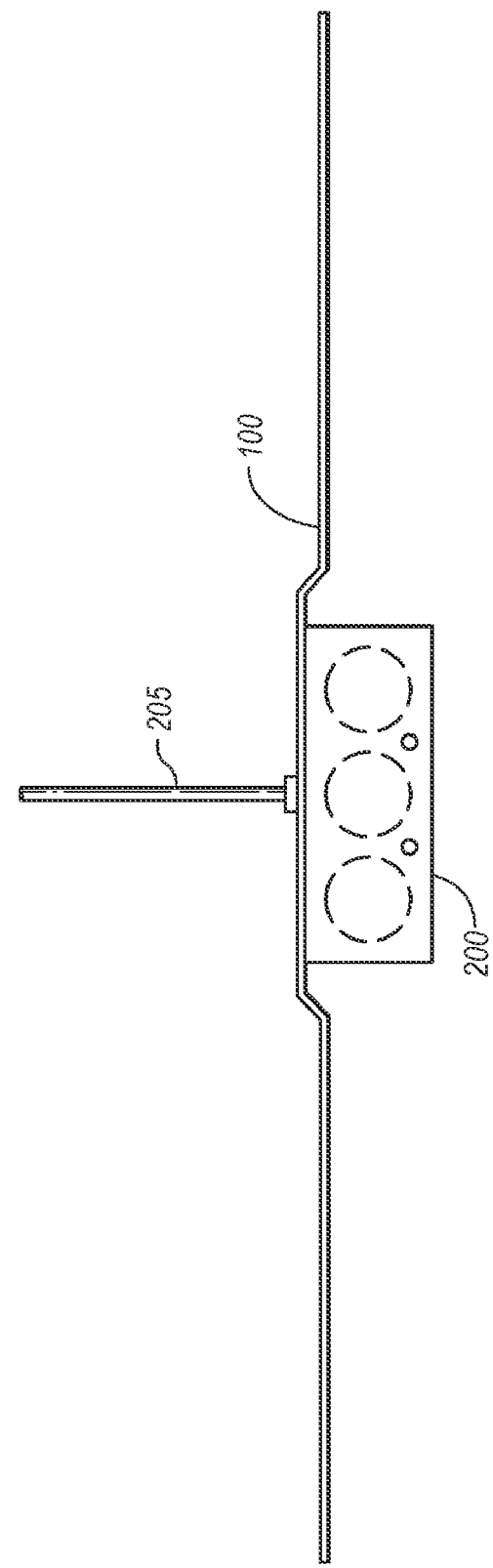

STRAPPING BASE AND ASSEMBLY

CROSS-REFERENCE TO RELATED APPLICATIONS

This application claims the benefit and priority of U.S. Provisional Application No. 60/892,473 filed Mar. 1, 2007, which is incorporated herein by reference in its entirety.

BACKGROUND

1. Field of the Invention

The present disclosure relates to electrical contractor supplies and to a multi-hole strapping base for strapping electrical conduits to one or more electrical box in which the box is secured to the strapping base and the conduits are then secured to the strapping base.

2. Background and Relevant Art

Conduits are frequently used to route electrical wire in electrical contracting. The conduits provide protection and/or act as a guide for wires. The conduits also may limit the accessibility of the wires due to very fact that the conduits act as housing. Electrical boxes are often used as connection, junction, and/or access points for the wires. Electrical boxes frequently include a flat base that is secured to a stationary or secure object. One or more walls then frequently surround the perimeter of the base to form a cavity or recess with the base. The walls often have openings in them to which the end of the conduit is secured. The wires are then routed into the cavity and to one or more other conduit as desired.

Building codes often require the conduits to be strapped within a predetermined distance of the opening in the wall to a relatively stationary object. In the past, another relatively stationary object, such as a pipe or board has been brought to the appropriate distance from the openings in the box. Each conduit is then secured to the opening. While providing for a relatively secure strapping point, the use of several conduits from a single box could become cumbersome as each of the conduits are then strapped to a single stationary object.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

As described herein, a strapping base includes a central portion having a generally flat surface, the central portion having a central hole pattern defined therein an angled portion coupling the central portion to the lateral portion, and at least one lateral portion having a generally flat surface and having a plurality of lateral holes defined therein, wherein the lateral portion is offset from the central portion.

In another example, a strapping base includes a generally flat central portion, first and second angled portions extending away from opposing ends of the central portion, and first and second lateral portion, the first and second lateral portions extending away from the angled portions, wherein the first and second lateral portions are generally parallel to the central portion and are offset from the central portion by the first and second angled portions and wherein the central portion, the first angled portion, the second angled portion, the first lateral portion, and the second lateral portion are formed from a single continuous piece of material.

In yet another example, an assembly includes an electrical conduit box having a base box hole pattern defined therein, the electrical conduit box further including a plurality of walls extending away from the base, the base having a plurality of holes defined therein. The assembly may also include a strapping base including a central portion having a generally flat surface, the central portion having a central hole pattern defined therein corresponding to the box hole pattern, an angled portion coupling the central portion to the lateral portion and at least one lateral portion having a generally flat surface and having a plurality of lateral holes defined therein, wherein the lateral portion is offset from the central portion such that bottom portions of the holes defined in the walls of the base are aligned with the lateral portions.

These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 1A and 1B illustrate a strapping base according to one example; and

FIGS. 2A through 2C illustrates a method of using a strapping base with an electrical box according to one example.

DETAILED DESCRIPTION

Figure 2C:
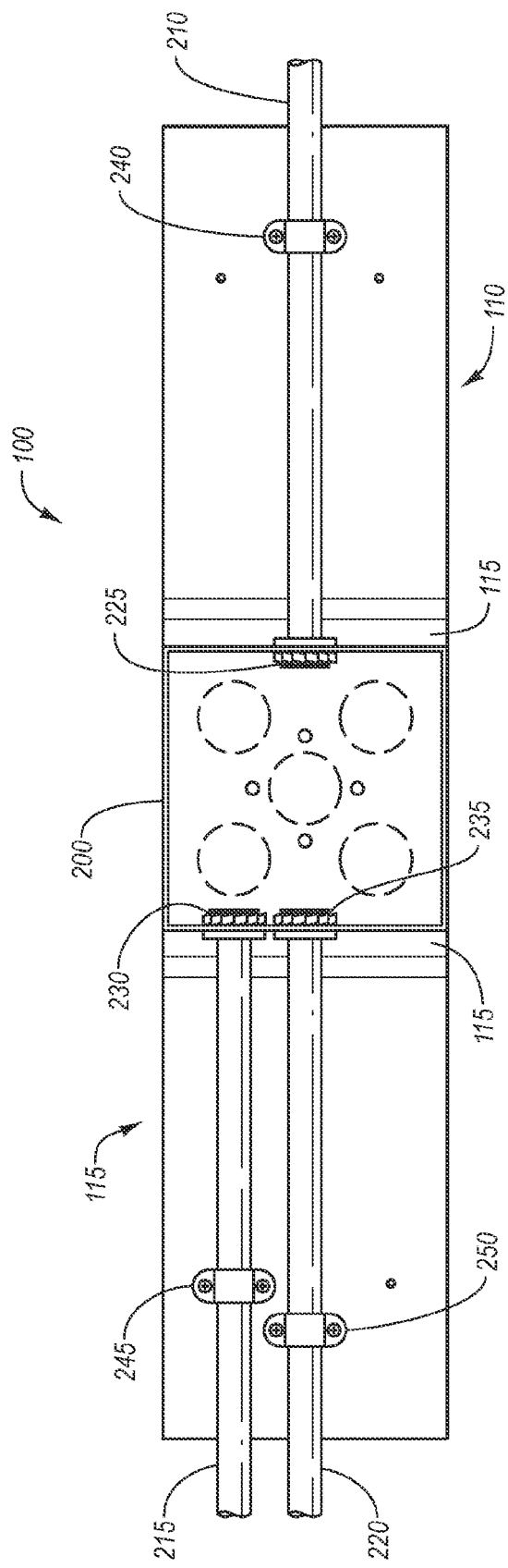

A strapping base and electrical box assembly is provided herein. The strapping base according to one example is formed from a single piece of material. The material is bent to form three portions, including a first lateral portion, a second lateral portion, and a center portion. The center portion may be recessed a desired distance from the first and second lateral portions. In one example, planes defined by the first and second lateral portions may be approximately parallel. Such planes defined by the first and second lateral portions may even be generally co-planar as desired. A plane defined by the center portion may be also be approximately parallel to the planes defined by the first and second lateral portions, regardless of whether planes defined by the first and second lateral portions are parallel to each other.

A plurality of holes is defined in each of the first and second lateral portions. The holes may be formed to correspond to openings in a selected electrical box. The holes formed therein are configured to receive fasteners to secure or "strap" conduits coupled to the electrical box. The holes may be spaced and configured to receive fasteners to secure single hole straps to the strapping base. As will be discussed in more detail below, the configuration of the fasteners allows for the strapping of two, three or more conduits one each side of electrical box using a single piece of material secured to a single anchoring base.

FIGS. 1A and 1B illustrate a view of a strapping base 100 from an exemplary bottom view and an exemplary frontal view. As illustrated in FIGS. 1A and 1B, the strapping base 100 includes a central portion 105 as well as one or more lateral portion, such as a first lateral portion 110 and a second lateral portion 115. Two lateral portions are described for ease of reference. It will be appreciated that a strapping base may also include a single lateral portion. Further, in other examples, a strapping base may be formed of two or more strapping bases, each having a central portion and a lateral portion.

In the example illustrated, and as seen more particularly in FIG. 1A, the first and the second lateral portion 110, 115 are coupled to the central portion 105 by first and second angled portions 120, 125 respectively. The central portion 105, the first and second angled portions 120, 125 and the first and second lateral portions 110, 115 may be formed of a single, unitary piece. The configuration of these portions relative to each other will first be discussed, followed by a discussion of hole patterns defined in each of these portions.

Turning particularly to FIG. 1A, the central portion 105 may be a generally flat surface. While described as being generally flat, it will be appreciated that the surface may have a curvature or other features that are not strictly flat. In the illustrated example, the first and second angled portions 120, 125 extend away from the central portion 105. In at least one example, strapping base 100 may be generally symmetrical about a central axis such that the first and second lateral portions 110, 115 as well as the first and second angled portions 120, 125 may be mirror images of each others. Accordingly, in at least one example, the first and second angled portions 120, 125 can be bent at approximately the same angle relative to the central portion 105. Such angles may be selected as desired and may range from approximately 30 degrees or less to approximately 90 degrees or more. Exemplary angles may be approximately 45 degrees. In the illustrated example, the first and second angled portions begin at the central portion 105 and extend a perpendicular distance away from the central portion 105 a desired distance.

Regardless of the configuration of the angled portions 120, 125, the angled portions provide separation between the central portion 105 and each of the first and second lateral portions 110, 115. In particular, in at least one example, the first and/or second lateral portions 110, 115 may be generally flat. While described as being generally flat, it will be appreciated that the surfaces may have a curvature or other features that are not strictly flat. Further, the first and/or second lateral portion 110, 115 may be generally parallel relative to each other and/or relative to the central portion 105.

As previously, the first and second angled portions 120, 125 provide separation between central portion 105 and the first and second lateral portions 110, 115. The distance of separation between the central portion 105 and the first and second lateral portions 110, 115 may be referred to as offset. The offset distance may be selected to bring the lateral portions 110, 115 into proximity or alignment with conduits that extend from an electrical conduit box. Accordingly, the offset distance offset may be approximately the distance between the base of an electrical conduit box and the bottom of holes defined in the box that are used to secure conduit. For ease of reference, the offset between each of the first and second lateral portions 110, 115 will be measured as a distance that is perpendicular to the central portion 105 to a plane that is generally parallel to the central portion 105 that intersects the first or second lateral portions 110, 115 where the first or second lateral portions 110, 115 the first or second angled portion 120, 125 respectively.

As previously introduced, the offsets may be the same for the first and second lateral portions 110, 115 or the offsets may be different. In at least one example, the offsets may range between about ¼ inch or less to about one inch or more, such as an offset of about ½ inch. Such dimensions are provided for ease of reference only. Any suitable offset may be selected and may be measured relative to any portion of the first or second lateral portions 110, 115.

In the example illustrated, the strapping base 100 may have a width of eighteen inches and a height of approximately four inches. The strapping base 100 may be formed of a single sheet of material, such as a single sheet of sheet metal. In at least one example, the strapping base 100 may be formed of 20 gauge sheet metal. Further, as described in more detail below with reference to FIG. 1B, the strapping base may include several hole patterns drilled therein for securing the strapping base to an electrical box and for securing conduit to the strapping base.

FIG. 1B illustrates a frontal view of the strapping base 100 in more detail. In particular, the central portion 105 includes a central hole pattern 130. The holes of the central hole pattern 130 may be selected to allow fasteners to pass through corresponding holes in a box and through the holes of the central hole pattern 130. Such a configuration may allow a box to be readily secured to the strapping base 100. In at least one example, the central hole pattern 130 include a central hole 135 as well gas first peripheral holes 140a-140d and second peripheral holes 145a-145d.

The first peripheral holes 140a-140d may be at 90 degree intervals about the strapping base 100. Further, peripheral holes 140a, 140c and central hole 135 may be substantially co-linear such that a line passing approximately through centers of each of these holes is aligned relative to a minor axis, or the height, of the strapping base 100. Similarly, the peripheral holes 140b, 140d and central hole 135 may be substantially co-linear such that a line passing approximately through these holes is aligned with a major axis, or the width, of the strapping base 100. Each of the peripheral holes 140a-140d can be the same size and can be centered approximately the same distance from the central hole 135. In one example, the central hole 135 is the same size as the peripheral holes 140a-140d, about ¼ inch in diameters. The peripheral holes 140a-140d may be located approximately ¾ inch from the center of the central hole 135.

Second peripheral holes 145a, 145c may be collinear with first peripheral holes 140a, 140c. Similarly, second peripheral holes 145b, 145d may be collinear with peripheral holes 140b, 140d. The second periphery holes 145a-145d may also be the same or different sizes and be located at the same or different distances from the central hole 130. In at least one example, centers of the second periphery holes 145a-145d may be located approximately 1¼ inches from the center of the central hole 130. Each of the second periphery holes 145a-145d may be $^{17}/_{64}$ inches in diameter. It will be appreciate that such a configuration is provided by way of illustration and that other hole patterns may be selected for use with other boxes.

With continuing reference to FIG. 1B, each of the first and second lateral portions 110, 115 may include lateral hole patterns 150, 155 defined therein. For ease of reference, lateral hole pattern 150 will be described alone, though the discussion of lateral hole pattern 150 may apply equally to lateral hole pattern 155.

The lateral hole pattern 150 may include first, second, third and fourth lateral holes 160, 165, 170, 175. First and second lateral holes 160, 165 may each be located approximately two inches from the lateral edge 180 of the first lateral portion 110. Further, the first and second lateral holes 160, 165 may be located approximately one inch from a top edge 185 and a bottom edge 190 respectively. In at least one example, a line passing through the first and second lateral holes 160, 165 may be generally parallel to a line passing through the first and third peripheral holes 140*a*, 140*c*.

Third and fourth lateral holes 170, 175 may be located approximately 1½ inches from the lateral edge 180 and 1⅝ inch from the top and bottom edges 185, 190 respectively. A line passing through the third and fourth lateral holes 170, 175 may be generally parallel to a line passing through the first and second lateral holes 160, 165. The lateral holes 160-175 may be of the same size or of different sizes. In at least one example, each of the lateral holes 160-175 can have a diameter of approximately 17/64 inch. Accordingly, lateral hole patterns may be defined in one or more of the lateral portions of a strapping base. While hole patterns are described, it will be understood that other hole patterns may be used in any combination on the strapping base, including strapping bases that do not have hole patterns defined in one or more portions thereof To this point, a strapping base has been defined that includes a central portion as well as at least one lateral portion that is offset from the central portion. One exemplary method of securing an electrical box will now be discussed in more detail.

FIGS. 2A-2C illustrate one exemplary method for securing an electrical box to the strapping base 100 and for strapping electrical conduit to the strapping base 100. As illustrated in FIG. 2A, a first step includes securing a box 200 to the strapping base 100. In at least one example, securing the box 200 to the strapping base 100 includes aligning a hole pattern in the box 200 to the central hole pattern 130 in the strapping base 100. Thereafter, the box 200 may be secured to the strapping base 100 with fasteners, such as self-tapping screws of the appropriate size. The box may include any number of conduit openings. In one example, the box 200 is configured to receive up to eight conduits or more from two or more conduits on each of the sides of the box 200.

After the box 200 has been secured to the strapping base 100, as illustrated in FIG. 2B, the assembled box 200 and strapping base 100 may be secured to a support 205. In at least one example, the support 205 may include a threaded rod, such as a threaded ¼ inch rod. The support 205 may be secured by threading a nut down the shaft of the threaded rod, passing a portion of the threaded rod through one of the holes defined in the strapping base 100 and/or the box 200 and threading a nut onto the end of threaded rod. Such an operation will place the strapping base 100 and/or the box 200 between the two nuts. The two nuts can then be tightened toward each other to secure the threaded rod to the strapping base 100 and/or the box 200.

Once the support 205 has been secured to the strapping base 200, conduits 210, 215, 220 may be coupled to the box 200 as illustrated in FIG. 2C. In at least one example, the box 200 may have a number of pre-scored portions that may be punched out in order to provide openings for connectors 225, 230, 235. The connectors 225, 230, 235 may be secured at the openings, after which the conduits 210, 215, 220 may be coupled to the connectors 225, 230, 235 to thereby secure the conduits 210, 215, 220 to the box 200.

The conduits 210, 215, 220 are then secured to the strapping base 200, as also illustrated in FIG. 2C. In one example, one-hole straps 240, 245, 250 may each be wrapped around the conduits 210, 215, 220 and then secured to the strapping base 100 using one of the lateral holes 160-175 (FIG. 1B). For example, fasteners, such as self-tapping screws, may be passed through the one-hole straps 240, 245, 250 and threaded into one of the lateral holes 160-175. The location of the lateral holes 160-175 (FIG. 1B) may be selected to conform with strapping requirements for building codes or the like.

Accordingly, the configuration of the strapping base 100 provides a strapping support to which multiple fasteners may be secured on one or more sides of the box 200. Thus, multiple conduits may be strapped on one or more of the sides to a single piece of material, thereby allowing an electrical contractor to rapidly strap as many conduits as desired.

Multiple strapping bases may also be grouped together to provide strapping on additional sides. Further, while a strapping base is displayed which includes two lateral portions, additional lateral portions may be included which are generally perpendicular or at any other angle relative to the first and second lateral portions. One such configuration would be a generally cross shaped strapping base formed of a single material that includes four lateral portions with predrilled holes configured to allow the strapping of multiple conduits to each of the four sides of a square or rectilinear type box.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A strapping base, comprising:
   a central portion having a generally flat surface, the central portion having a central hole pattern defined therein;
   first and second lateral portions each having a generally flat surface and having a plurality of lateral holes defined therein, wherein the first and second lateral portions are offset from the central portion;
   a first angled portion coupling the central portion to the first lateral portion;
   a second angled portion coupling the central portion to the second lateral portion; and
   a strap secured to one of the first and second lateral portions and configured to secure a conduit to the strapping base.

2. The strapping base of claim 1, wherein the central portion is generally parallel to the first and second lateral portions.

3. The strapping base of claim 1, further comprising a third lateral portion.

4. The strapping base of claim 3, wherein each of the lateral portions are generally parallel to the central portion.

5. The strapping base of claim 1, wherein the central portion, the angled portions, and the lateral portions are formed from a single piece of material.

6. The strapping base of claim 5, wherein the single piece of material includes a single piece of sheet metal.

7. The strapping base of claim 1, wherein at least one of the lateral portions is offset from the central portion by at least about ½ inch.

8. The strapping base of claim 1, wherein the central hole pattern defined in the central portion corresponds to a hole pattern of an electrical conduit box.

9. The strapping base of claim 1, wherein the strap is positioned at least about seven inches from a center of the central hole pattern.

10. The strapping base of claim 1, wherein the central portion is configured to be directly secured to a support member when in operational use.

11. The strapping base of claim 10, wherein a hole in the central hole pattern of the central portion is configured to receive the support member.

12. A strapping base, comprising:
a generally flat central portion;
first and second angled portions extending away from opposing ends of the central portion;
first and second lateral portions, the first and second lateral portions extending away from the angled portions;
a first means for securing a first conduit to the first lateral portion of the strapping base; and
a second means for securing a second conduit to the second lateral portion of the strapping base,
wherein the first and second lateral portions are generally parallel to the central portion and are offset from the central portion by the first and second angled portions and wherein the central portion, the first angled portion, the second angled portion, the first lateral portion, and the second lateral portion are formed from a single continuous piece of material.

13. The strapping base of claim 12, wherein each of the first and second securing means is positioned at least about seven inches away from a center of the central hole pattern.

14. An assembly, comprising:
an electrical conduit box having a base and a plurality of walls extending away from the base, the base having a box hole pattern defined therein and at least one of the walls having a plurality of holes defined therein; and
a strapping base including:
a central portion having a generally flat surface, the central portion having a central hole pattern defined therein corresponding to the box hole pattern;
at least one lateral portion having a generally flat surface and having a plurality of lateral holes defined therein;
an angled portion coupling the central portion to the at least one lateral portion, wherein the at least one lateral portion is offset from the central portion such that bottom portions of the holes defined in the at least one wall of the electrical conduit box are aligned with the at least one lateral portion.

15. The assembly of claim 14, wherein a plurality of lateral holes are defined in the lateral portion and are at least about seven inches from a center of the central hole pattern.

16. The assembly of claim 14, wherein a hole in the central hole pattern of the central portion and a corresponding hole in the box hole pattern of the base are configured to receive a support member to which the assembly is secured when in operational use.

* * * * *